US006227347B1

(12) United States Patent
Bryant et al.

(10) Patent No.: US 6,227,347 B1
(45) Date of Patent: May 8, 2001

(54) CONVEYOR SYSTEM FOR ROD-LIKE ARTICLES

(75) Inventors: Leonard James Bryant; Anthony Robert Brown, both of High Wycombe; Peter Alec Clarke, Haddenham; John Dawson, Crick; Kerry Hierons, High Wycombe; Ivan Yehudi Hirsh, High Wycombe; Robert Antony Macgregor, High Wycombe; Neil Thorp, Upton; Robert Howard Taylor, High Wycombe, all of (GB)

(73) Assignee: Molins Plc, Milton Keynes (GB)

( * ) Notice: Subject to any disclaimer, the term of this patent is extended or adjusted under 35 U.S.C. 154(b) by 0 days.

(21) Appl. No.: 09/077,373

(22) PCT Filed: Nov. 27, 1996

(86) PCT No.: PCT/GB96/02927

§ 371 Date: Sep. 28, 1998

§ 102(e) Date: Sep. 28, 1998

(87) PCT Pub. No.: WO97/19605

PCT Pub. Date: Jun. 5, 1997

(30) Foreign Application Priority Data

Nov. 27, 1995 (GB) .................................................. 9524179
May 8, 1996 (GB) .................................................. 9609621

(51) Int. Cl.$^7$ ..................................................... A24C 5/352
(52) U.S. Cl. ................. 198/430; 198/347.1; 414/331.08; 414/331.16
(58) Field of Search .............................. 198/347.1, 430; 414/331.08, 331.1, 331.16, 417

(56) References Cited

U.S. PATENT DOCUMENTS

| 4,229,137 | * | 10/1980 | Molins ............................... 198/347.1 |
| 4,585,386 | * | 4/1986 | Gumann et al. .................. 198/347.1 |
| 4,751,996 | * | 6/1988 | Knecht ............................... 198/347.1 |
| 5,478,184 | * | 12/1995 | Bryant et al. ..................... 198/347.1 |

FOREIGN PATENT DOCUMENTS 2 174 667 * 11/1986 (GB) .................................... 198/430

* cited by examiner

Primary Examiner—Christopher P. Ellis
Assistant Examiner—Mark A. Deuble
(74) Attorney, Agent, or Firm—Antonelli, Terry, Stout & Kraus, LLP

(57) ABSTRACT

A conveyor system for transporting cigarettes between a making machine and a packing machine includes a mass flow conveyor (204) for transporting cigarettes directly and a reservoir system (212) in which successive batches of cigarettes comprising portions of the stream on an input conveyor (204) are diverted when required into compartmented containers (224). Transfer to the containers is made by way of a plunger (232) and shuttle (234) arrangement which allows the stream to move continuously during transfer of a batch. Unloading containers to reform a continuous stream may involve use of a similar plunger and shuttle arrangement so that the reformed stream can move continuously on an output conveyor (218). The input and output conveyors (204, 218) may be provided with retractable spaced partitions to bound the ends of batches of cigarettes transferred from or to the respective conveyor.

23 Claims, 11 Drawing Sheets

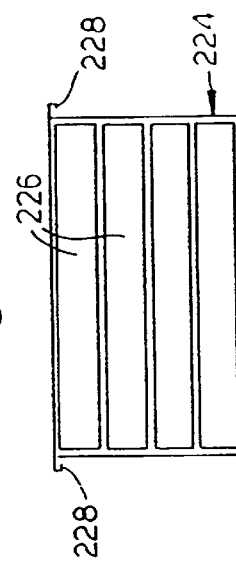
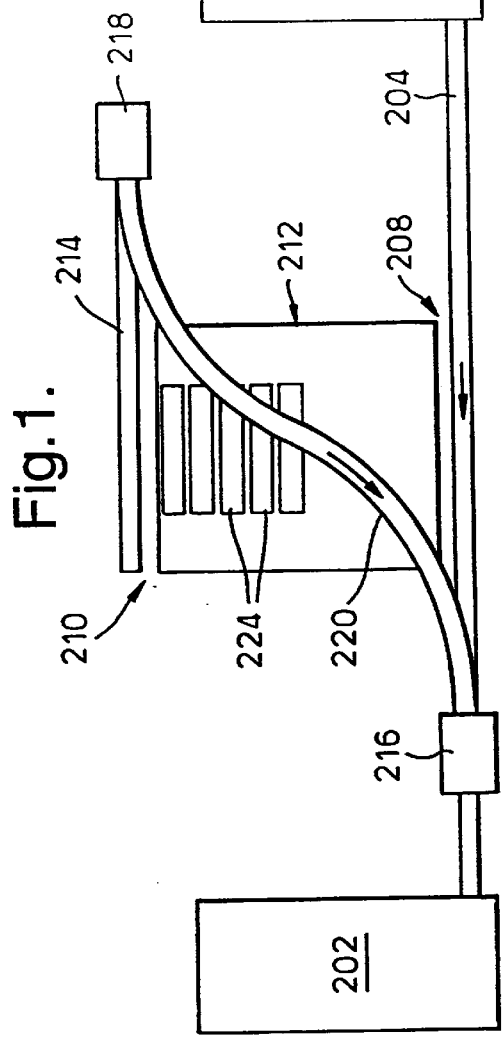
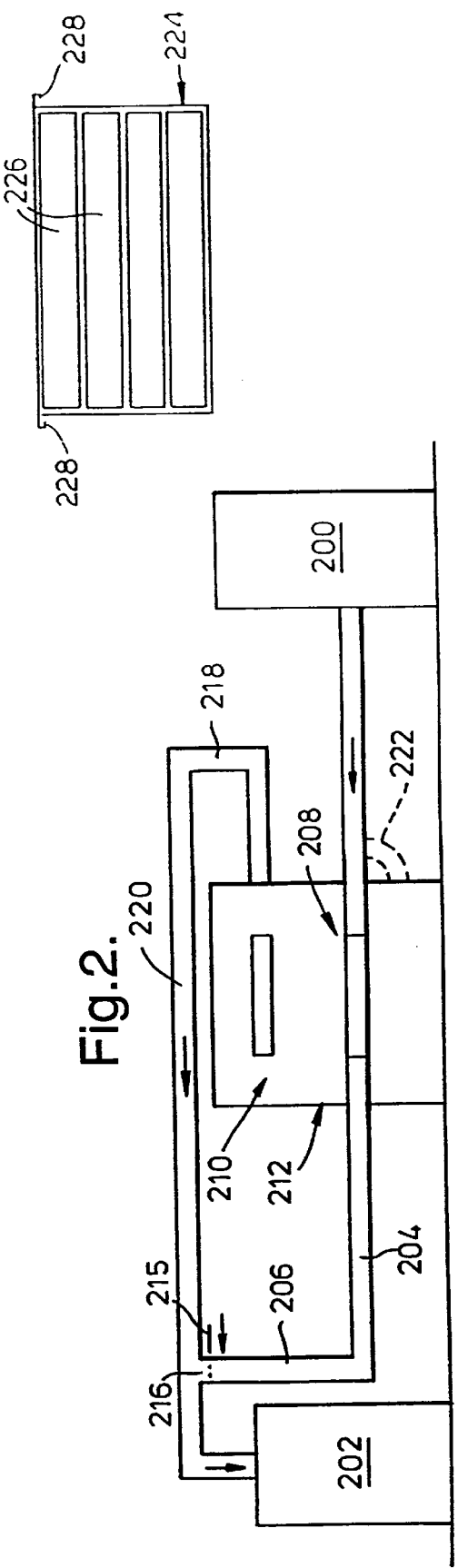

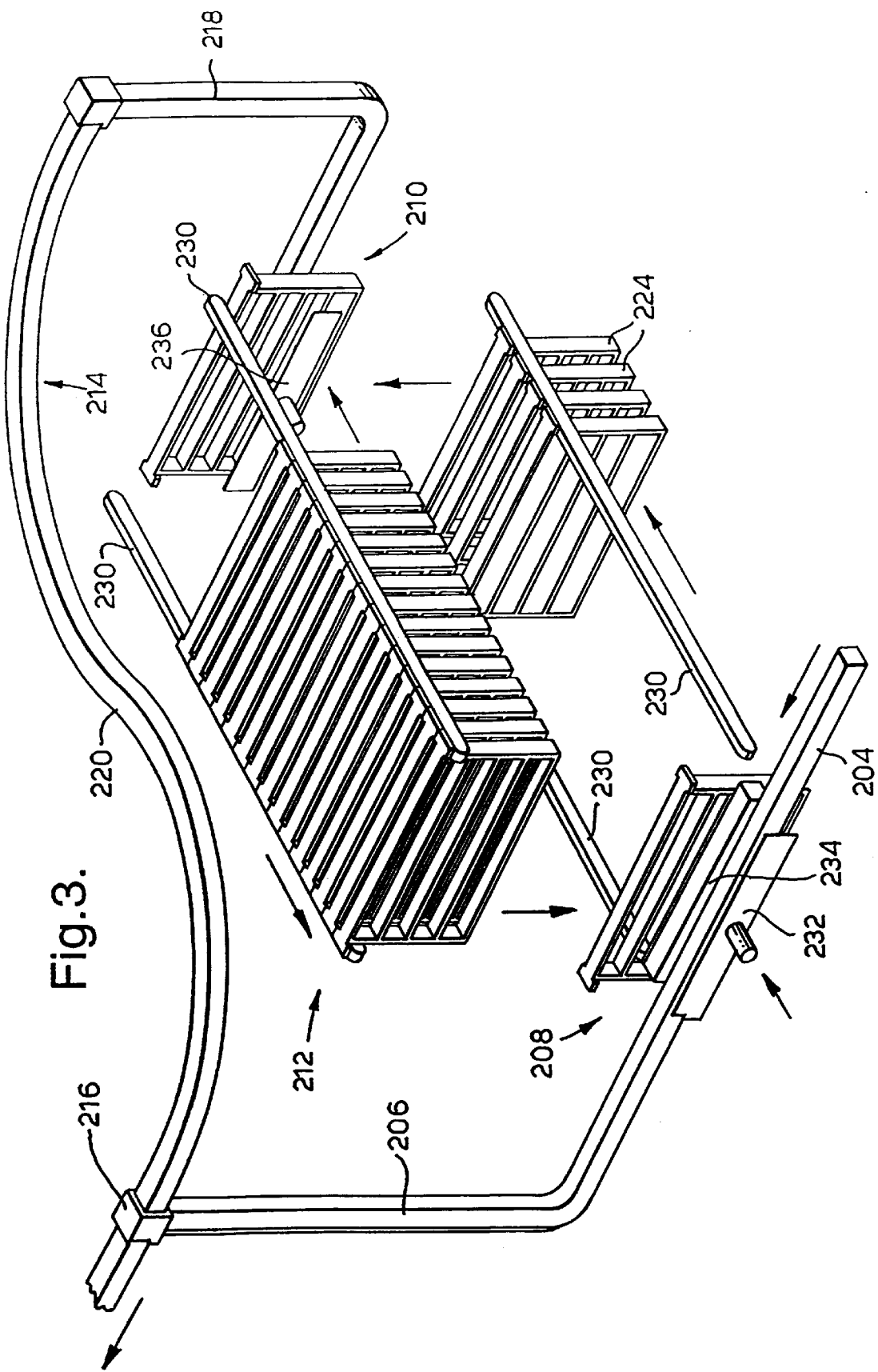

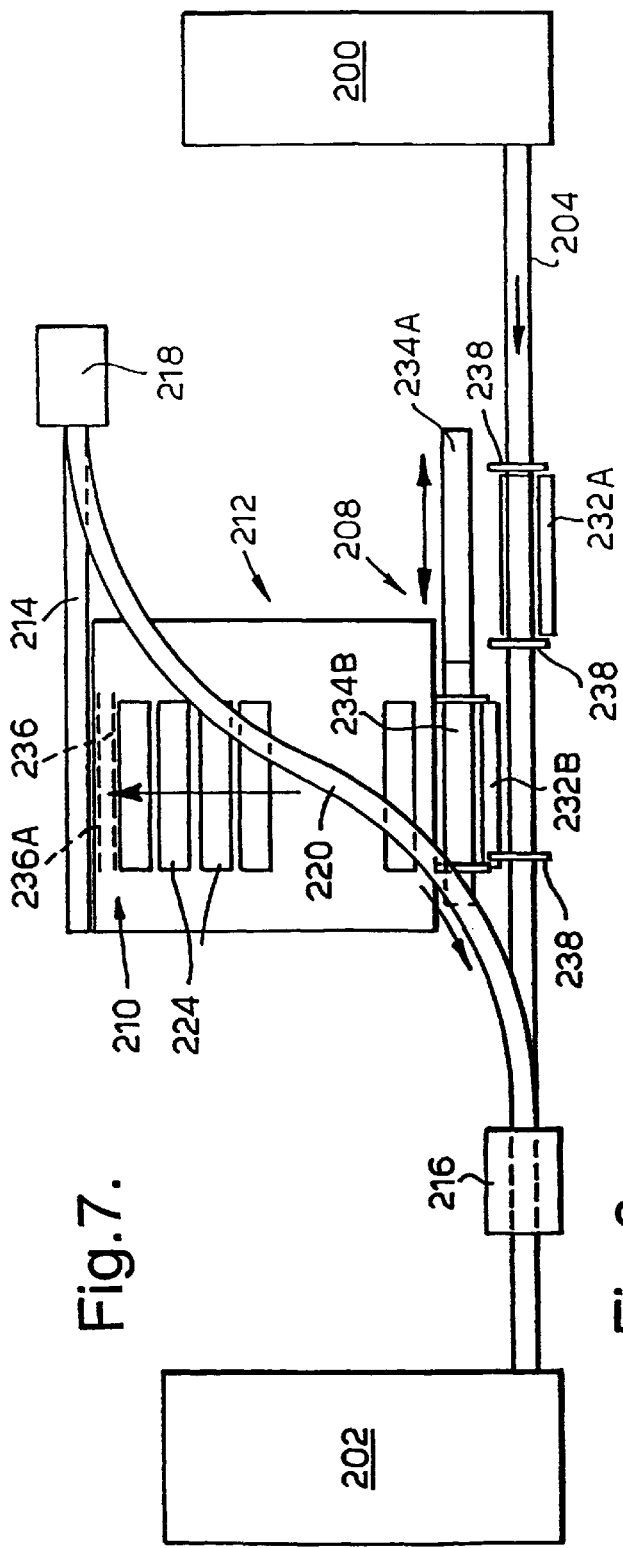
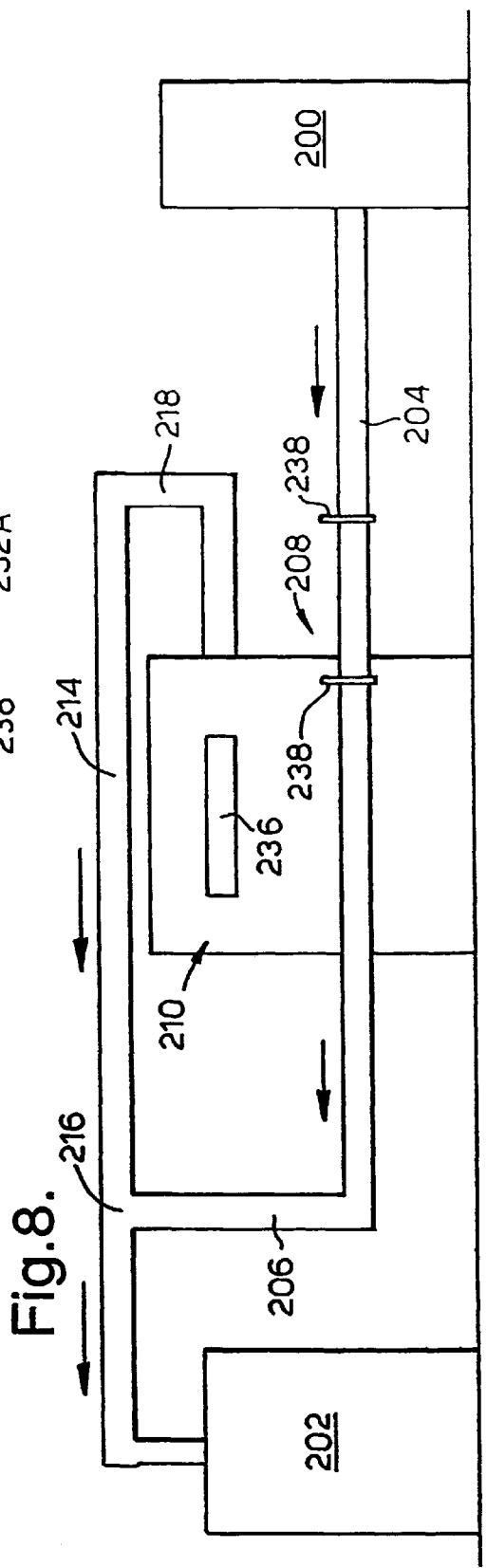

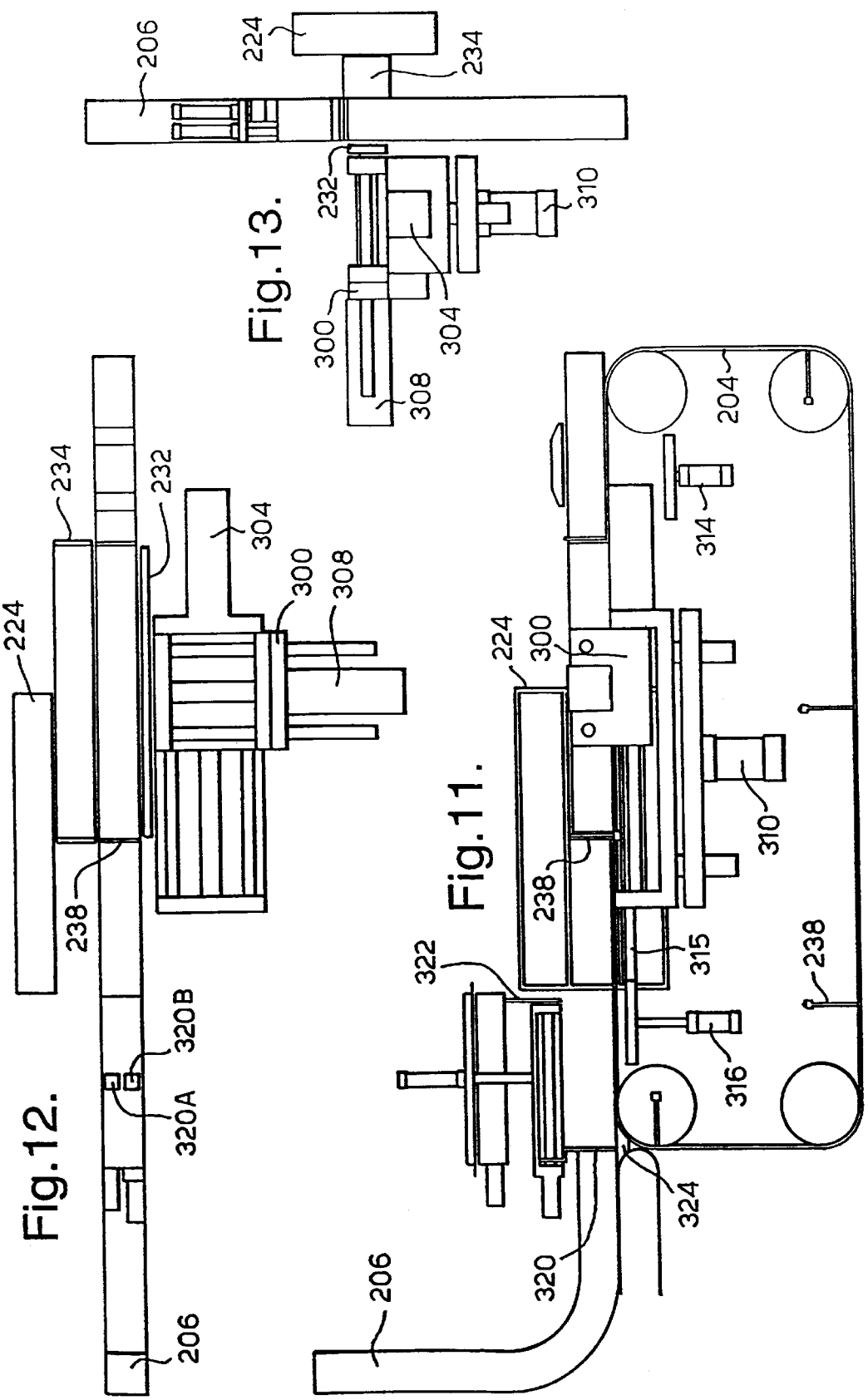

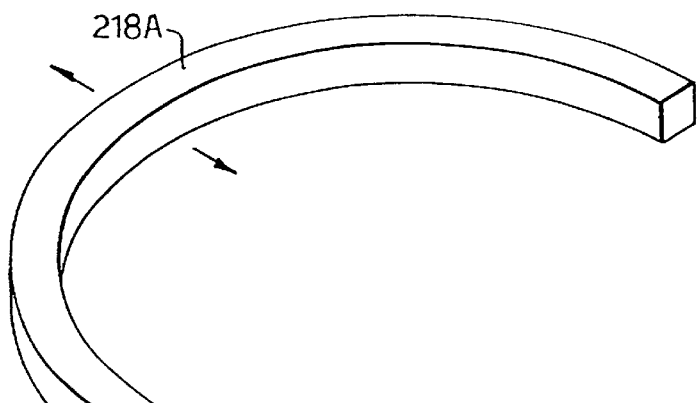
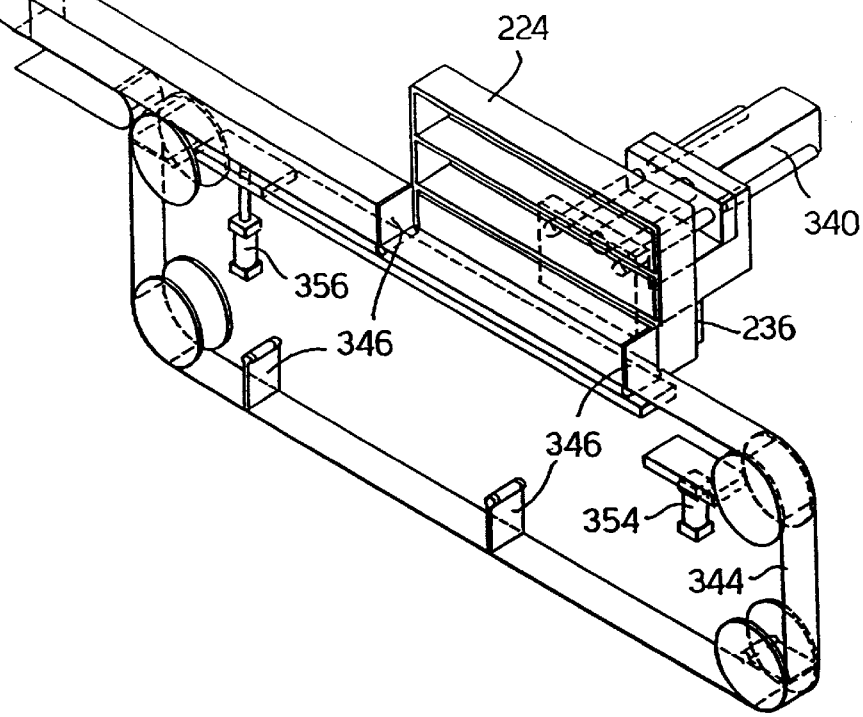
Fig.18.
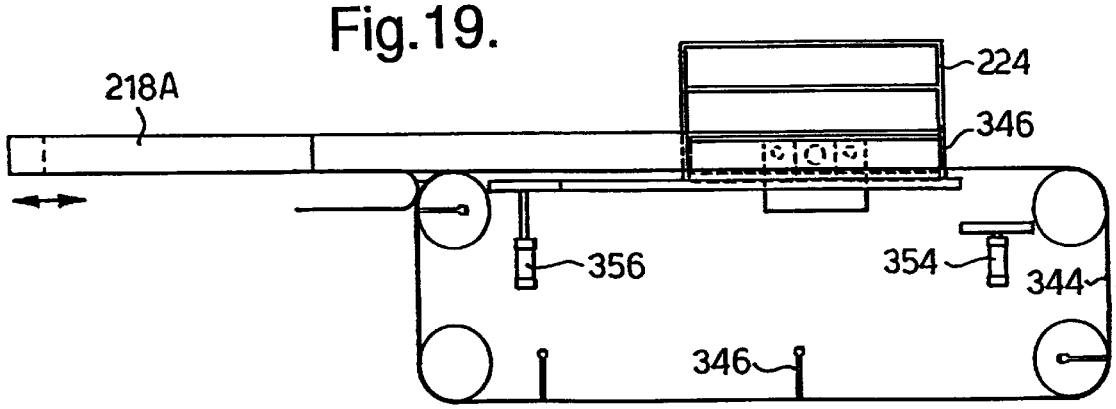
Fig.19.

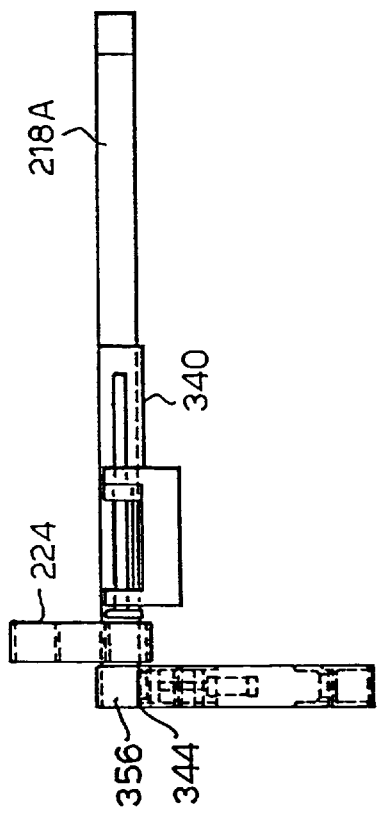
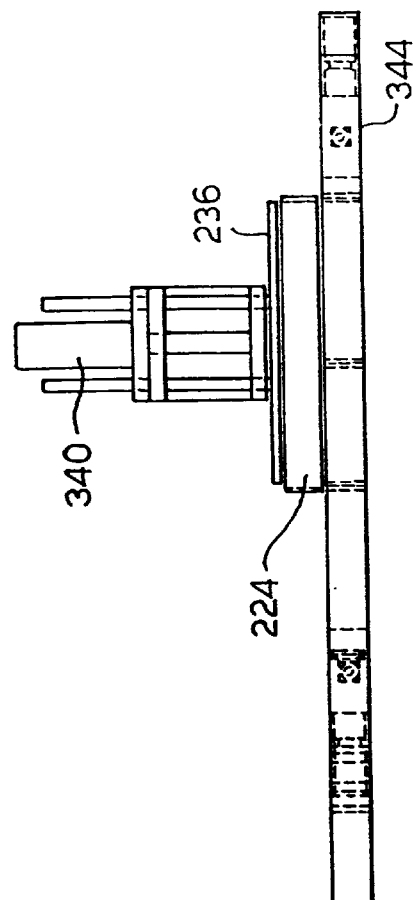
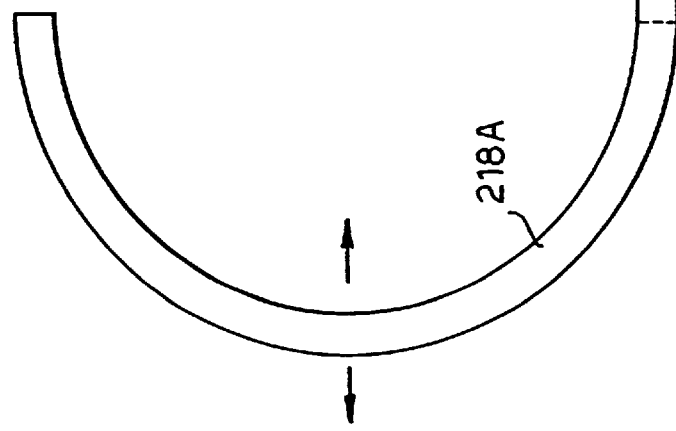
Fig.21.
Fig.20.

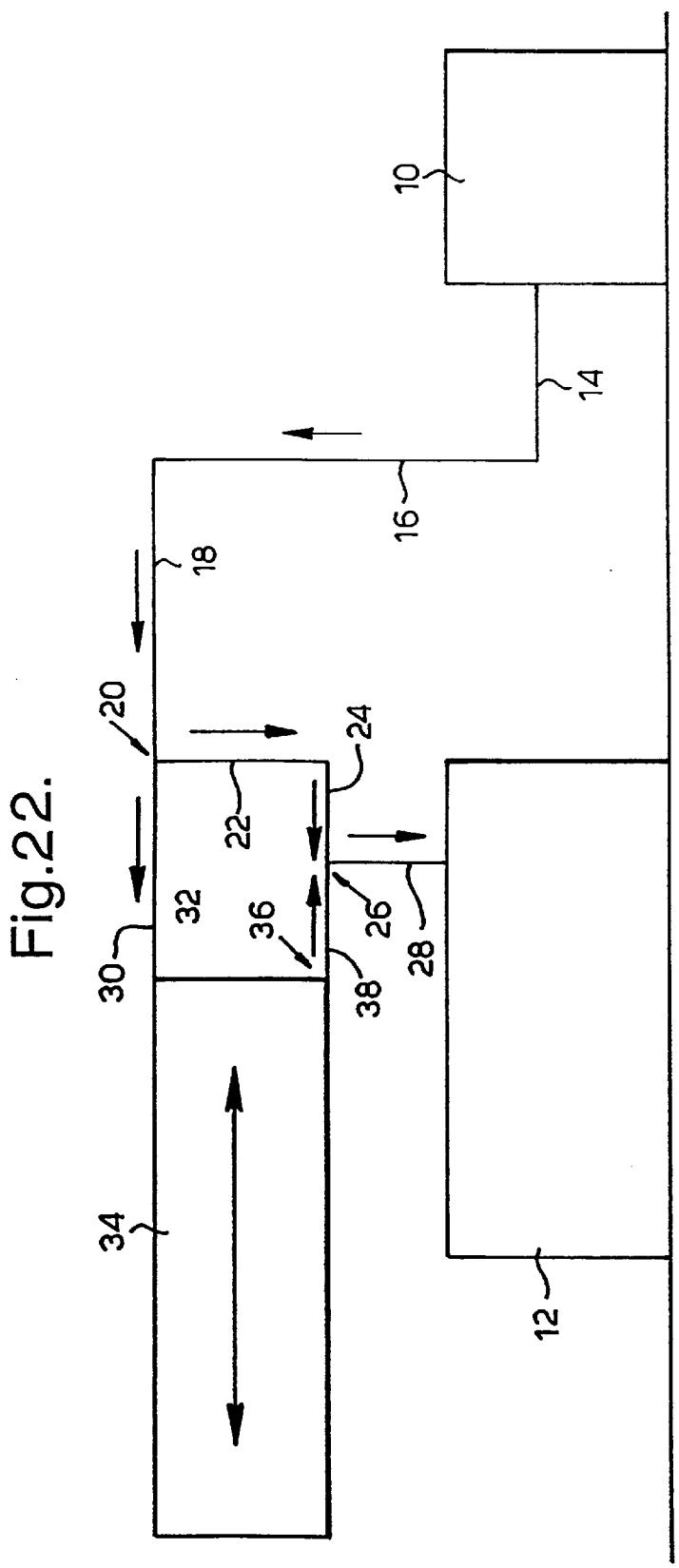

CONVEYOR SYSTEM FOR ROD-LIKE ARTICLES

This invention relates to a conveyor system for rod-like articles, particularly articles of the tobacco industry such as cigarettes or filter rods.

In the manufacture of articles of the tobacco industry it is common to transport the articles directly from a delivery device such as a producing machine to a receiving device such as a packing machine, with the articles being conveyed in the form of a continuous multi-layer stream of articles moving in a direction transverse to the lengths of the articles. Typically such streams are 90–100 mm in height. It is known to provide a conveyor system for such articles which incorporate a buffer reservoir facility for accommodating temporary or longer term differences in the rates of operation of the delivery and receiving devices. Known buffer reservoirs providing this facility may incorporate variable length conveyors for storing directly a stream of articles in multi-layer stack formation and/or means for loading (and unloading) articles in containers.

According to a first aspect of the invention a conveyor system for rod-like articles, particularly for conveying articles between a producing device and a receiving device, includes conveyor means for conveying a stream of articles in multi-layer stack formation in a direction transverse to their lengths, and means for transferring batches comprising portions of the stream between the conveyor means and a transfer position by movement of the articles in a direction parallel to the lengths of the articles, wherein said transferring means is arranged so that at least in the region of said conveyor means the articles being transferred continue to move in said transverse direction. Transfer may be from the conveyor means, e.g. into a stationary container at the transfer position, or from the transfer position (e.g. from a stationary container) to the conveyor means. In a preferred arrangement for transfer from the conveyor means the transferred batch of articles continues to travel at the rate of said conveyor means for such distance as is required to allow said conveyor means to move continuously at a predetermined rate. Subsequently said batch may be slowed for transfer into a stationary container.

In a preferred arrangement successive batches comprising portions of a stream on a substantially horizontal conveyor may be transferred into one or more containers at a loading station, said batches being defined by partitions inserted into the stream in the same manner as disclosed in British patent specification No. 1404141. The batches may be transferred by means of a pusher which moves with the conveyor as well as across it and they may be received in a shuttle or other device which initially moves with the conveyor but subsequently slows to deliver the portions into a stationary container. The shuttle may be reciprocated to transfer successive batches.

British patent specification No. 1404141 discloses a container buffer reservoir system for use between a cigarette making machine and a cigarette packing machine. In this system batches of cigarettes in multi-layer stack formation are transferred between an endless band conveyor and a compartmented container (and vice versa) by action of pusher means which moves the batches in a direction parallel to the lengths of the articles. By contrast with the present invention, transfer takes place without movement of the articles in a direction transverse to their lengths.

According to a further aspect of the invention a conveyor system for rod-like articles, particularly for conveying articles between a producing device and a receiving device, includes means defining a conveying path for articles in multi-layer stack formation moving in a direction transverse to their lengths, transfer means for transferring successive batches of said stream from said path at a transfer position, first partition means including spaced first partitions for bounding the respective leading and trailing ends of successive batches delivered on said path to said transfer position, second partition means including at least one second partition for bounding the trailing end of a stream of articles on said path downstream of said transfer position, and means for moving said first and second partitions at different rates, whereby, following transfer of a batch at said transfer position to leave a gap in said path between a first partition at the leading end of a stream extending on said path upstream of said transfer position and a second partition at the trailing end of a stream extending on said path downstream of said transfer position, said respective first and second partitions may be brought together so that a continuous stream of articles may be reformed on said path by withdrawal of said partitions after they have been moved into mutually adjacent positions, thereby closing said gap.

According to a still further aspect of the invention a conveyor system for rod-like articles, particularly for conveying articles between a producing device and a receiving device, includes conveyor means for conveying a stream of articles in multi-layer stack formation in a direction transverse to the lengths of the articles, means for loading articles into containers, means for unloading articles from containers and for delivering said articles to said conveyor means, wherein said delivering means includes means for transferring articles in a direction parallel to their lengths while conveying them also in a direction transverse to their lengths, so that said conveyor means may operate continuously. This transfer of batches of cigarettes from a container may be by way of a shuttle or the like, in a manner similar to that proposed for transfer of batches to containers.

In British patent specification No. 2296000 there is disclosed a cigarette making and packing system in which successive leading portions of a mass flow stream delivered from a making machine are loaded into one or more containers which are subsequently unloaded for recombination into a mass flow stream conveyed to the packing machine. The present application discloses apparatus similar to that disclosed in FIG. 5 of said specification in a system including a direct mass flow path between a making machine and a packing machine, i.e. where only some of the articles are loaded into containers.

Known buffer reservoirs include those of the so-called first-in first-out types where the first articles (or group of articles) which enter the reservoir are the first to leave. Examples of such reservoirs are disclosed in British patent specification No. 1301843 and European patent specification No. 581143A. These examples relate to reservoirs for continuous streams of rod-like articles: examples of such reservoirs for articles in containers are disclosed in British patent specification No. 2296000.

U.S. Pat. No. 4,751,996 (corresponding to EP 208190A) discloses a conveyor system for conveying cigarettes at least in part in multi-layer stack formation between an inlet and a packing machine, the system including alternative paths for the cigarettes consisting of a normal or main L-shaped conveying path and a path through a storage device having channels arranged in a zig-zag configuration.

According to another aspect of the invention a conveyor system for rod-like articles comprises a delivery device, a receiving device, and conveyor means defining first and second paths extending between the delivery device and the receiving device and on which streams of said articles are conveyed in multi-layer stack formation, said first path being relatively direct and said second path extending through a variable capacity first-in first-out buffer reservoir for said articles. Preferably the first and second paths include common portions upstream and downstream of first and second junctions at which said paths respectively diverge and converge. The second path preferably includes a portion leading to an inlet to and a portion leading from an exit from the reservoir. Said first and second junctions may conveniently comprise T-junctions.

The reservoir may conveniently be of the type disclosed in said British patent specification No. 1301843 or in FIGS. 6 and 7 of said British patent specification No. 2296000. Basically these reservoirs comprise a reservoir conveyor extending around laterally spaced guides in a generally helical path. the spacing of the guides being variable to vary the capacity of the reservoir. Alternatively, the reservoir may comprise a container reservoir.

In a preferred mode of operating the conveyor system, with the speeds of the delivery and receiving devices matched, the articles are transferred between the devices on the first relatively direct path. When there is a mismatch between the speeds of the delivery and receiving devices articles are delivered to or received from the reservoir by way of the second path. A small flow of articles may be arranged to pass along the second path at all times, thereby avoiding occupation of any articles in the reservoir for an excessive period of time. Alternatively, or additionally, the conveyor means of the second path (including the reservoir) may be periodically deliberately run (irrespective of the need to do this according to the speeds of the delivery and receiving devices) in order to ensure that no articles remain in the reservoir (or elsewhere on the second path) for an excessive period.

The invention will be further described, by way of example only, with reference to the accompanying diagrammatic drawings, in which:

FIG. 1 is a plan view of a conveyor system for rod-like articles,

FIG. 2 is a side view of the system of FIG. 1,

FIG. 3 is a perspective view of another conveyor system for rod-like articles,

FIG. 4 is a side view of a container of the system of FIG. 3,

FIG. 7 is a plan view of a further conveyor system for rod-like articles,

FIG. 8 is a side view of the system of FIG. 7,

Figure 10:
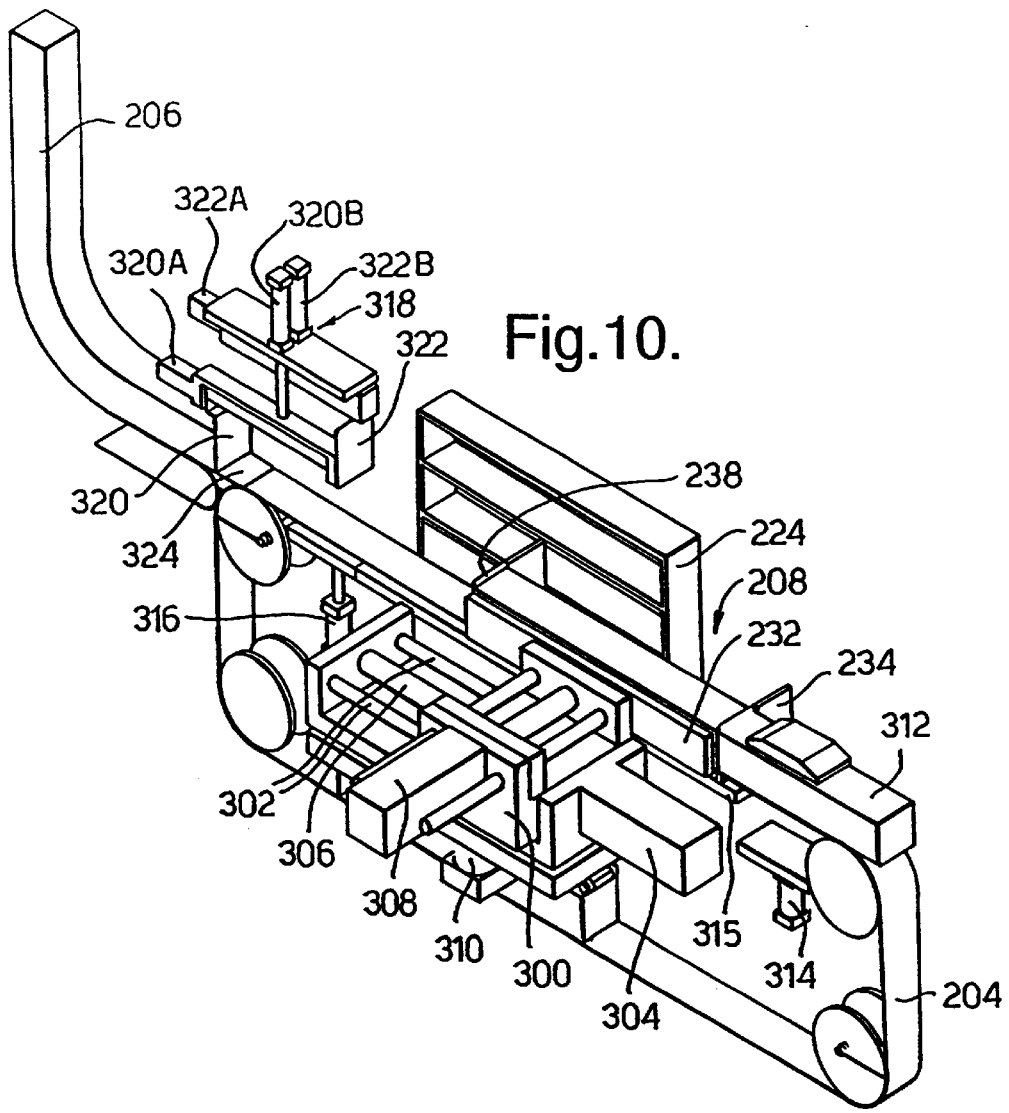
Figure 14:
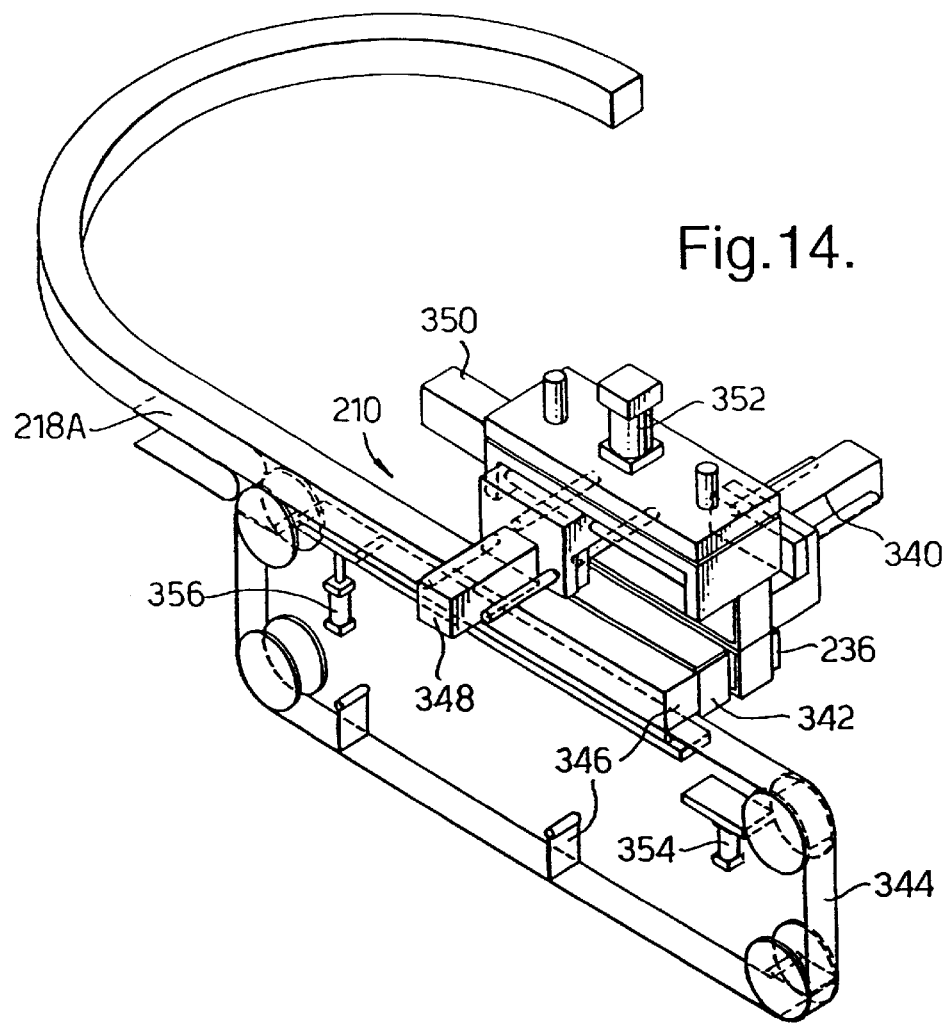
Figure 15:
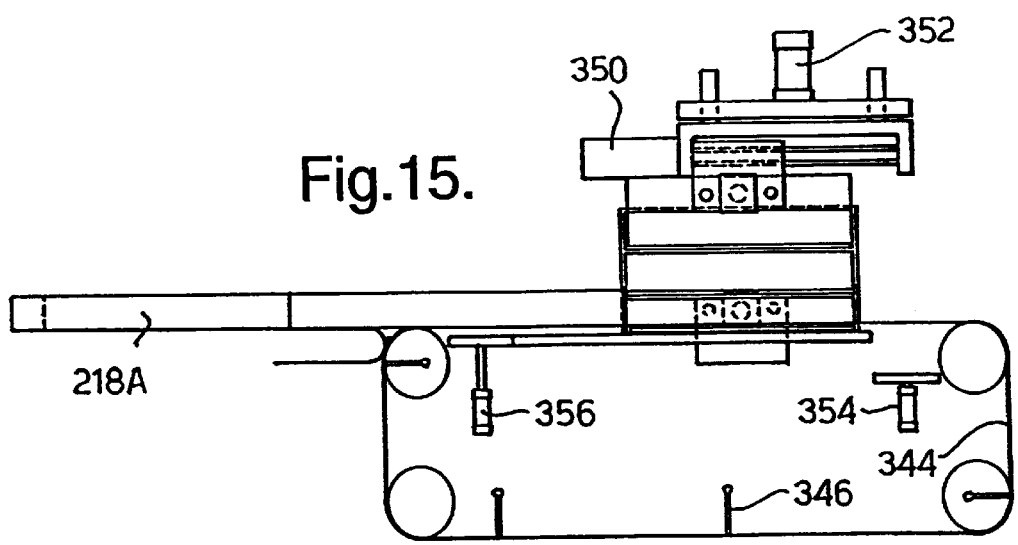
Figure 16:
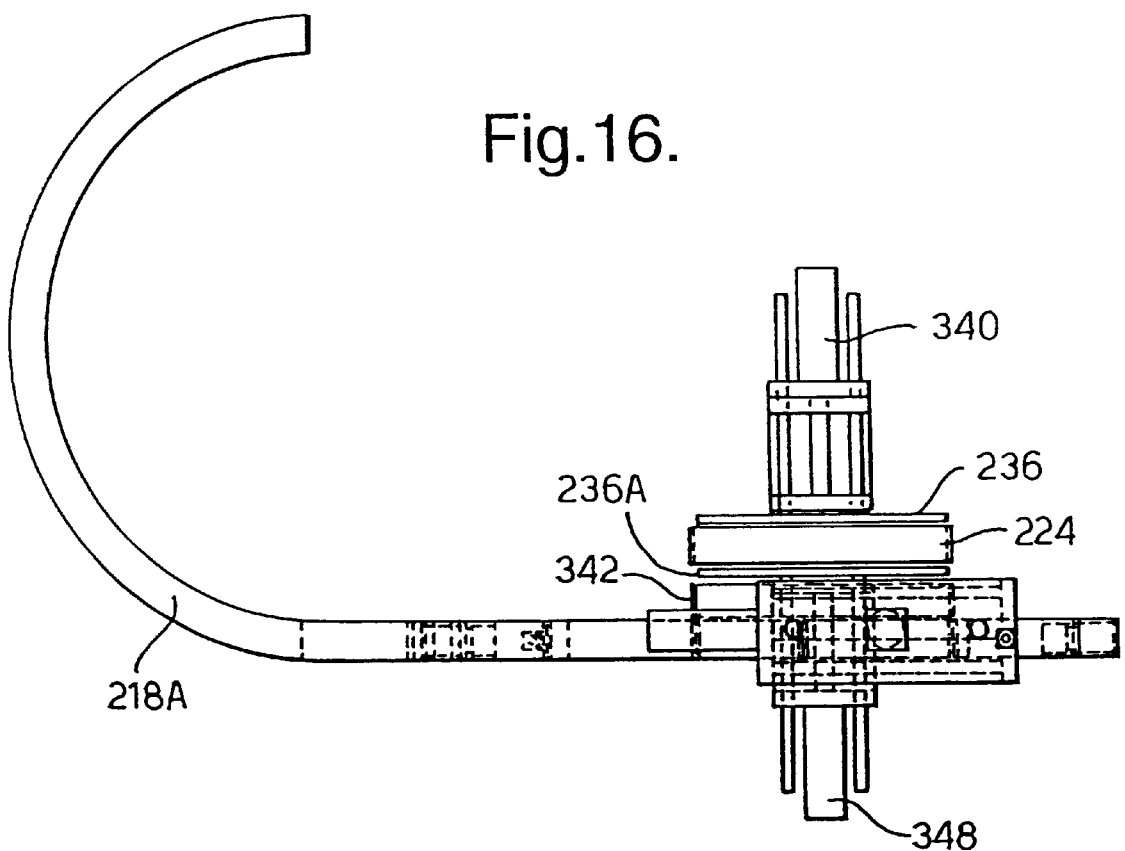
Figure 17:
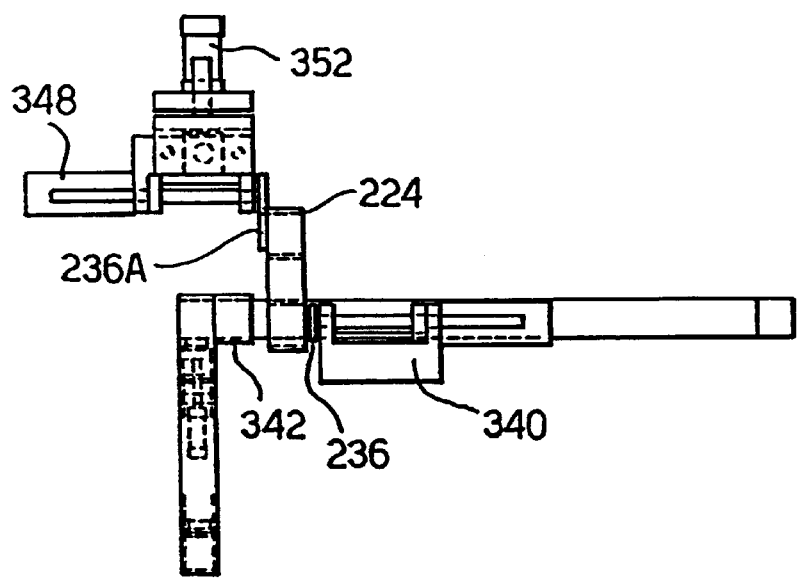

FIG. 10 is a perspective view of part of another conveyor system for rod-like articles, FIG. 11 is a side view of the system of FIG. 10, FIG. 12 is a plan view of the system of FIG. 10, FIG. 13 is an end view of the system of FIG. 10, FIG. 14 is a perspective view of part of another conveyor system for rod-like articles, FIG. 15 is a side view of the system of FIG. 14, FIG. 16 is a plan view of the system of FIG. 14, FIG. 17 is an end view of the system of FIG. 14, FIG. 18 is a perspective view of part of yet another conveyor system for rod-like articles, FIG. 19 is a side view of the system of FIG. 18, FIG. 20 is a plan view of the system of FIG. 18, FIG. 21 is an end view of the system of FIG. 18, and FIG. 22 is a side view of yet another conveyor system for rod-like articles.

The conveyor system shown in FIGS. 1 and 2 extends between a cigarette making machine 200 and a cigarette packing machine 202. A mass flow conveyor 204, which includes an elevator 206, extends between the machines 200 and 202 and conveys a continuous stream of cigarettes in multi-layer stack formation. A container loading unit 208 is located adjacent to the conveyor 204 and serves to load cigarettes from the conveyor 204 into containers (such as those shown in FIG. 4) when required. Containers carrying cigarettes are transported from the loading unit 208 towards a container unloading unit 210 by means of a container transport unit 212. Cigarettes unloaded from containers at the unloading unit 210 are reformed into a continuous mass flow stream on a conveyor 214 which extends to a junction 216 with the conveyor 204 at the top of the elevator 206. The conveyor 214 includes an elevator 218 and a portion 220 having an S-shape in plan.

The form of the loading unit 208 and unloading unit 210 may be similar to that disclosed in British patent specification No. 1404141, to which reference is directed for details. Thus, compared with that system, the system shown in FIGS. 1 and 2 of the present application differs in that not all of the cigarettes flowing from the making machine 200 are loaded into containers, although that mode of operation would be possible and for such purpose a closable gate 215 is provided to extend across the top of the elevator 206 at the junction 216.

As indicated diagrammatically in the drawing, the loading unit 208 receives batches of cigarettes directly from the conveyor 204. Alternatively, the loading unit 208 could operate from a conveyor 222 which branches from the main conveyor 204. In this way it would not be necessary to insert dividers of the type disclosed in said specification No. 1404141 into the stream of cigarettes on the main. conveyor 204.

Figure 5:
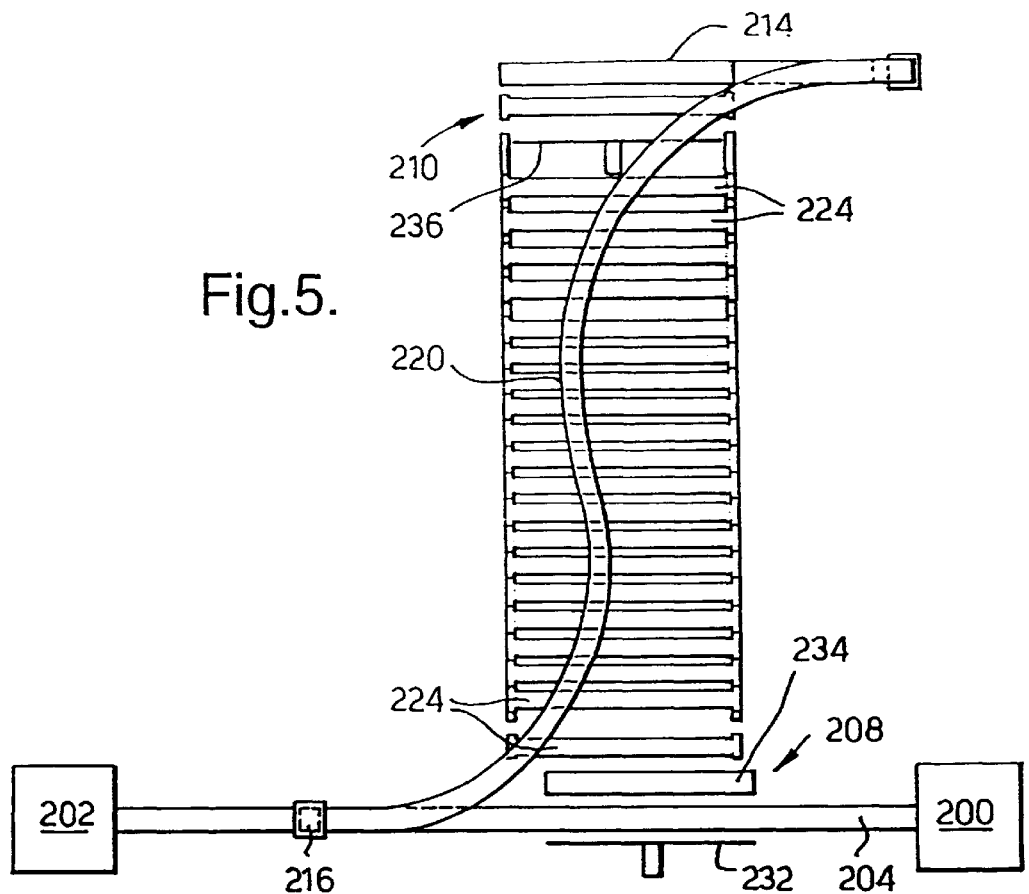
FIG. 5 is a plan view of the system of FIG. 3.

Operation of the system shown in FIGS. 1 and 2 is similar to that of the system, of FIG. 5 of said British patent specification No. 2296000 except that generally the majority of cigarettes produced by the making machine 200 pass directly to the packing machine 202 by way of the direct path along conveyor 204. Cigarettes are only loaded into containers at the loading unit 208 when the production of the making machine 200 exceeds the requirements of the packing machine 202. Similarly, cigarettes are unloaded from containers at the unloading unit 210 when the requirements of the packing machine 202 exceed the production at the making machine 200. In addition, the system is controlled such that containers are unloaded according to predetermined requirements, e.g. in the same order as that in which they are loaded, i.e. so that the transport unit 212 for containers acts as a variable capacity first-in first-out reservoir. In order to achieve this each container may carry a programmable tag or other device capable of recording time of loading at the unit 208. Thus the unit 208 may include write device and the unit 210 a read device to facilitate control as required. Furthermore, the system may operate such that containers are automatically unloaded at the unit 210 a predetermined time after loading or production: in this way no cigarettes should remain unpacked for an excessive period.

FIGS. 3–6 show a system having many similarities with that of FIGS. 1–2: similar reference numbers have been used for similar parts. The system of FIGS. 3–6 can be operated in any of the ways described with reference to the system of FIGS. 1 and 2.

As shown particularly in FIG. 4, each container 224 comprises four compartments 226, each capable of holding a stack of cigarettes having the same height as the stream on conveyor 204. Typically each compartment 226 may hold about 1250 cigarettes. Each container 224 has side ledges 228 at its upper corners, from which the containers may be suspended on rails 230 in the transporting unit 212.

When loading of cigarettes is required successive portions of the stream 204 are sub-divided by partitions movable with the conveyor (for example, as described in said specification No. 1404141 or as described below with reference to FIGS. 7–9), each portion having substantially the same width as a compartment 226 of a container 224. At the loading unit 208 a pusher 232 transfers the portion of the stream from between the partitions onto a shuttle 234. The pusher 232 and shuttle 234 move at the speed of the conveyor 204 during transfer but subsequently decelerate so as to have no component of movement in the direction of conveyor 204 just prior to transfer of the portion of the stream from the shuttle and into an adjacent compartment 226 of a container 224 at the loading unit 208. The shuttle 234 may take any form, e.g. a rectangular sleeve, capable of maintaining the formation of the portion of stream during transfer: the shuttle is moved on its path parallel to the conveyor 204 by a reciprocating drive (not shown). After transfer, the shuttle 234 and pusher 232 return to their original positions to transfer the next portion of the stream on conveyor 204 if required. At the same time the container 224 is indexed downwards (or replaced by the next empty container) so as to be ready to receive the next portion. The conveyor 204 continues to move during transfer of a portion of the stream to a compartment 226. The pusher 232 moves laterally at the same speed as conveyor 204 until the portion of the stream has been transferred from the conveyor and onto the shuttle 234. Consequently the path of the pusher 232 as seen in FIG. 5 is at an angle to the conveyor 204 and its start position is initially upstream of the position of the receiving container 224. The return path of the pusher 232 avoids the path of the conveyor 204 (e.g. by passing over the top of the advancing stream of cigarettes on the conveyor). Successive full containers 224 are conveyed along a lower pair of rails 230 of the container transport unit 212 towards the unloading unit 210. Empty containers 224 for filling at the loading unit 208 are delivered along an upper pair of rails 230 and indexed downwards at the unit 208.

Unloading of containers 224 at the unloading unit 210 is a reversal of loading. A container 224 is elevated intermittently to bring compartments 226 to a position in alignment with a horizontal portion of the conveyor 214 and a pusher 236 transfers the portion of cigarettes in a compartment onto the conveyor between upstanding partitions. During transfer the conveyor 214 may be stationary, so that it is moved intermittently to receive successive portions from successive compartments 226, or alternatively a shuttle (not shown) may be provided in a manner similar to that provided at the loading unit 208, so that successive portions may be transferred from a container 224 to a continuously moving conveyor 214. In either case the partitions are progressively withdrawn after transfer so as to reform a continuous stream on the conveyor 214, as described in said specification No. 1404141. After a container 224 has been unloaded at the unit 210 it is received on the upper pair of rails 230 and advanced back towards the loading unit 208 The transport unit 212 includes conveyor means for advancing containers 224 along the rails 230 or in any other convenient manner and for lowering containers at the loading unit 208 and for elevating containers at the unloading unit 210: these are not illustrated in the drawings but may be similar to conventional tray transport means already known in the cigarette industry.

As with the system of FIGS. 1 and 2, the system may be operated in such manner that all the product of the making machine 200 is loaded into containers 224 for transfer to the packing machine 202 by way of the unloading unit 210 and conveyor 214. For this purpose a gate similar to that disclosed in British patent specification No. 2157253, to which reference is directed for details, may be provided at the junction 216.

Irrespective of whether all or part of the stream of cigarettes on conveyor 204 is loaded into containers 224 the containers 224 in the transport unit 212 create a first-in first-out variable capacity cigarette reservoir. A control system for determining the period of occupation of full trays in the reservoir may be provided as described with reference to FIGS. 1 and 2.

Although it may be preferred to operate the system as self-contained, in which case typically there would be up to, say, 25 full containers in the transporting unit 212, providing a typical reservoir capacity of 125,000 cigarettes, it would equally be possible to add or remove full or empty containers from the unit 212, e.g. by additional transfer units (not shown) at the respective ends of the paths on the rails 230.

Figure 9:
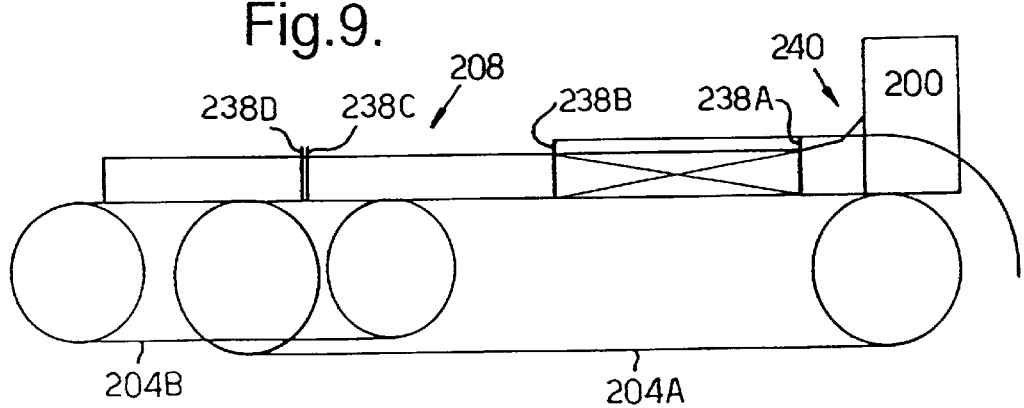
FIG. 9 is an enlarged side view of part of the system of FIG. 7.

The system shown in FIGS. 7–9 is basically similar to that shown in FIGS. 3–6: again similar reference numbers have been used for similar parts. This system may be operated in the same way as that of FIGS. 1 and 2 and FIGS. 3–6.

In FIGS. 7 and 8 two positions 232A, 232B of the pusher 232 are shown, as well as two positions 234A, 234B of the shuttle 234. In addition, partitions 238, which divide the stream on conveyor 204 into portions for transfer by the pusher 232 are shown. FIG. 9 shows diagrammatically a first partition conveyor 204A extending from the region of a stack former 240 at the making machine 200 and carrying spaced partitions 238A, 238B and 238C. When it is required to load portions of cigarettes into containers at the loading unit 208 the partitions 238 are raised to their extended positions as shown in FIG. 9 to separate the stream into portions: at other times the partitions are not raised above the surface of conveyor 204, so that a continuous stream of cigarettes is maintained on the conveyor. During loading at the unit 208 portions of the stream on conveyor 204 are transferred so as to leave gaps between successive partitions 238, i.e. so that in FIG. 9 there would be no cigarettes between the partitions 238B and 238C. During loading the trailing end of the stream of cigarettes on the downstream part of conveyor 204 (which is stationary) is bounded by a partition 238D carried by the conveyor 204B. After transfer of one or more portions of the stream into a container at the loading unit 208 and when it is required to cease loading portions of the stream and to reform a continuous stream on the conveyor 204 the leading end of the stream on conveyor 204A, bounded by the partition 238C, is advanced towards the trailing end of the stream of the conveyor on the downstream part of conveyor 204, which is bounded by partition 238D until the partitions 238C and 238D are substantially adjacent, after which the partition 238C is progressively retracted followed by the partition 238D. It will be understood that in order to achieve this condition at the start of each loading operation a partition corresponding to the partition 238D carried by the conveyor 204B must always be inserted into the stream alongside a partition carried by the conveyor 204A and bounding the leading end of the first portion of the stream to be loaded. Subsequently the conveyor 204B and remainder of conveyor 204 downstream of the loading unit 208 remains stationary until loading has ceased and it is required to reform a continuous stream on conveyor 204 as described.

It will be understood that loading of portions of the stream 204 while allowing the upstream part of conveyor 204 to continue to move avoids the need for a separate buffer reservoir to absorb cigarettes produced by the making machine 200 while the conveyor 204 would otherwise be stationary. In practice it may be necessary in any event to provide a small buffer reservoir to accommodate cigarettes produced during the period that the making machine 200 continues to operate if the packing machine 202 fails immediately after partitions 238 carried by the conveyor 204 have passed the loading unit 208. The maximum necessary capacity for such a buffer reservoir would be the number of cigarettes in a compartment 226. This buffer reservoir may be provided in a downstream portion of the conveyor 204, e.g. adjacent the packing. machine 202.

It is similarly an advantage to provide a shuttle at the unloading unit 210. In this case, however, there may need to be an additional pusher 236A to transfer the batch of cigarettes from the shuttle onto the conveyor 214. The reason for this is that the pusher 236 cannot pass through the container 224 at the unloading unit 210 and continue to move in the direction of movement of the conveyor 214. The additional pusher 236A may, for example, be operated from overhead.

FIGS. 10–13 show in more detail an arrangement which achieves movements of the pusher 232, shuttle 234 and partitions 238 in a system similar to that of FIGS. 7–9. The shuttle 234 and pusher 232 are connected to a carriage 300 movable on linear guides 302 in a direction parallel to partition conveyor 204 under the action of a drive 304 operating a recirculating ball screw 306. The pusher 232 is advanced relative to the carriage 300 to push a portion of the stream on conveyor 204 into the shuttle 234 and then into the container 224 by action of a similar drive 308. After operation of the drive 308 to push a portion into a container 224 a further drive 310 is provided to lift the pusher 232 so that it clears the advancing stream 312 on conveyor 204 during its return stroke.

The conveyor 204 includes partitions 238 which are lifted by a lifting unit 314 and lowered by a lowering unit 316. A rail 315 maintains the partitions 238 in their raised positions through the loading position 208. Beyond the loading position 208 is a further drive unit 318 including stop plates 320, 322 which can be inserted in a stream on the conveyor 204 from above. The plate 320 is movable parallel to conveyor 204 by means of a linear drive 320A and is movable from an upper position in which the plate is above the level of a stream of cigarettes on conveyor 204 to a lower position in which it is inserted in the stream by means of a further drive 320B. The plate 322 is similarly movable by a linear drive 322A and a further drive 322B.

Following initiation of a loading cycle the plate 320 is inserted either immediately adjacent to the leading partition 238 on the conveyor 204 or so that it follows the lowering profile of the leading partition 238, as determined by the lowering unit 316. The plate 320 then bounds the trailing edge of the stream after the leading partition 238 has been lowered. During the period when the plate 320 follows the path of the leading partition 238 on the conveyor 204 it is advanced in the direction of the conveyor by the drive 320A and is lowered by the drive 320B The stop plates 320 and 322 may be inserted immediately in front of or immediately behind a partition 238 or, if they are provided with exactly the same lowering profile as that provided for the partition 238 by the lowering unit 316, they may be aligned with and immediately above the partition 238. Alternatively, the plates 320, 322 and the partitions 238 may comprise relatively laterally-spaced parts so that the plates 320 and 322 may be inserted in alignment with a partition 238 and without interference with it. The plates 320,322 could be carried by an overhead partition conveyor (i.e. somewhat similar to the conveyor 204) instead of by the linear drive arrangements.

When the requirement for loading portions of the stream into a container 224 at the loading station 208 ceases, so that it is required to reform a continuous stream, the plate 322 follows the leading partition 238 until it reaches the position of the stationary plate 320, which is just above a dead plate 324 arranged between the end of conveyor 204 and the beginning of conveyor 206, at which position both plates 320 and 322 are retracted upwards and conveyance of a continuous stream on the conveyor 206 can recommence.

FIGS. 14–17 show an arrangement for reforming a continuous stream of cigarettes on a conveyor 218A at an unloading unit 210 in a system similar to that shown in FIGS. 7–9. A first pusher 236 is operable by means of a drive 340 to cause a batch of cigarettes to be unloaded from a container 224 and moved into a shuttle 342. A second pusher 236A operating from overhead is operable to move a batch from the shuttle 342 and onto a conveyor 344 carrying partitions 346. A first drive 348 for the pusher 236A causes it to move in a direction to remove a batch of cigarettes from the shuttle 342. A second drive 350 causes movement of the pusher 236A in a direction parallel to the conveying direction of the conveyor 344. A third drive 352 causes the pusher 236A to be lowered into an operative position and to be raised on its return so as to avoid interference with operation of the pusher 236 which causes the batches to be transferred from the container 224 and into the shuttle 342.

A lifting unit 354 is provided for the partitions 346 on conveyor 344, so as to present spaced partitions which are movable with the shuttle 342. A lowering unit 356 causes successive partitions to be lowered so as to allow formation of a continuous stream on conveyor 218A.

It will be appreciated that by operation of the shuttle 342 the stream on conveyor 218A may be conveyed continuously. An alternative arrangement, in which the stream is conveyed intermittently at the unloading station 210, but which can still achieve continuous conveyance of a stream from the conveyor 218A is shown in FIGS. 18–21. This arrangement omits the shuttle 342 and second pusher 236A but is otherwise similar to that of FIGS. 14–17.

The conveyor 344 is operated intermittently, so that the pusher 236 delivers batches of cigarettes from the container 224 onto the conveyor 344 between partitions 346 while the conveyor is stationary. The conveyor 218A includes a buffer reservoir capacity, provided by movement of the conveyor around a wheel (not shown) around which the conveyor passes in a manner substantially as disclosed in British patent specification No. 2263680. By causing the buffer to deliver cigarettes during periods when the conveyor 344 is stationary and to replenish its capacity during periods when the conveyor 344 is moving, a continuous stream of cigarettes may be conveyed downstream of conveyor 218A.

Either of the shuttles 234, 342 could be replaced by a partition conveyor which indexes with and may be driven from the movement of the respective pushers 232 or 236A.

The conveyor system shown in FIG. 22 extends between a cigarette making machine 10 and a cigarette packing machine 12 and includes several unidirectional sections each of which conveys a continuous stream of cigarettes in multi-layer stack formation. From the making machine 10 a short lower horizontal conveyor 14 leads to an elevator 16 at the upper end of which an upper horizontal conveyor 18 conveys cigarettes to a first T-junction 20. A downdrop or chute 22. descends from the T-junction 20 and leads into a first intermediate level horizontal conveyor 24 extending to a second T-junction 26. A further downdrop or chute 28 extends from the T-junction 26 and into the packing machine 12.

At the first T-junction 20 a further upper horizontal conveyor 30 leads to the inlet or entrance 32 of a variable capacity reservoir 34. A further conveyor 38 at the same intermediate level as the conveyor 24 extends from the exit 36 of the reservoir 34 to the second T-junction 26.

Figure 6:
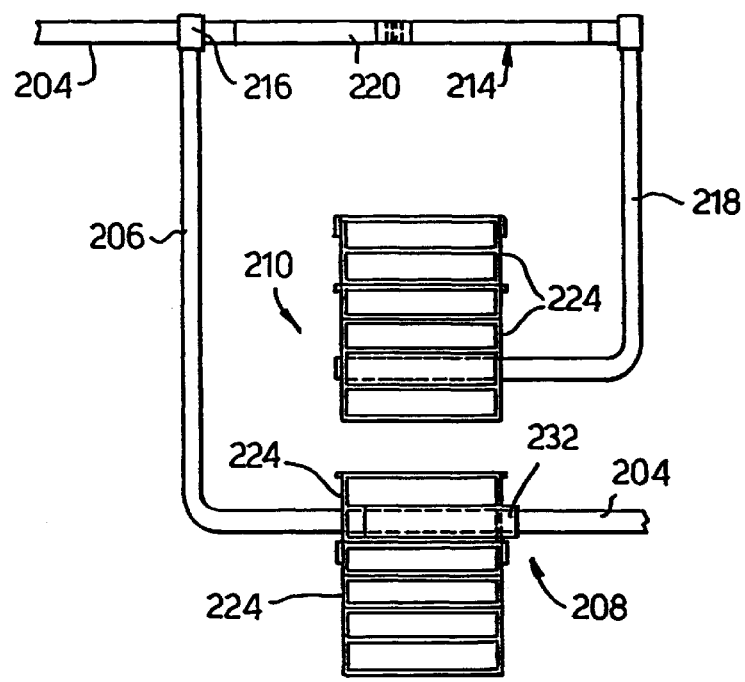
FIG. 6 is a side view of the system of FIG. 3.

The reservoir 34 is a first-in first-out reservoir of the kind shown in FIGS. 6 and 7 of said British patent specification No. 2296000 or in British patent specification No. 1301843, to which reference is directed for details. In essence, the reservoir 34 comprises a variable length of conveyor extending between the entrance 32 and the exit 36. The reservoir 34 could be replaced by other forms of variable capacity first-in first-out reservoirs capable of receiving a multi-layer stream of articles at an entrance and delivering a multi-layer stream of articles at an exit. Such reservoirs need not maintain the stream at a substantially constant height (as, preferably, does the reservoir 34). Moreover, the stream need not be continuous in such alternative reservoirs: for example, the reservoir 34 could be replaced by the transport unit 212 for containers as disclosed in FIGS. 1 and 2. Any of these alternative reservoirs may be operated in substantially the same way as the reservoir 34, as hereinafter described.

In normal operation, when the speeds of the making machine 10 and the packing machine 12 are matched, cigarettes flow along the path defined by conveyors 14–28. If the speed of the making machine 10 exceeds that of the packing machine 12, cigarettes also flow along conveyor 30 with the reservoir 34 expanding to accept additional cigarettes. Similarly, if the speed of the packing machine 12 exceeds that of the making machine 10, cigarettes flow from the reservoir 34 by way of conveyor 38 to the second T-junction 26 to supplement flow from the making machine arriving via the conveyor 24, and the reservoir correspondingly contracts. It will be understood that the speeds of the various conveyors is controlled electronically, in particular using speed sensors for the making machine 10 and packing machine 12 and cigarette level detectors at the T-junctions 20 and 26: control of conveyors in this manner is well-known in the cigarette industry and need not be further described here.

Where the speeds of the making machine 10 and the packing machine 12 are matched it is theoretically possible for cigarettes to remain in the reservoir 34 for an extended period of time. In order to avoid this, which in extreme circumstances could lead to cigarettes of inferior quality being delivered to the packing machine 12, the system may be arranged so that there is generally a slight trickle of cigarettes through a reservoir 34, i.e. even when the reservoir 34 would otherwise be stationary or even expanding a small flow of cigarettes. is taken from the exit 36 (with a corresponding inflow at the inlet 32). Alternatively or additionally, the flow of cigarettes to the reservoir 34 may be controlled based on elapsed time. Thus. the reservoir 34 may be emptied periodically, so that no cigarette may remain in the reservoir for a period exceeding a predetermined maximum time, or the maximum time any cigarette can have been in the reservoir may be actively monitored (which may readily be achieved by detecting and recording conveyor speeds) and emptying of the reservoir 34 controlled so as to ensure that no cigarette remains in the reservoir for longer than a predetermined maximum time. Typically the maximum time for cigarettes to remain in the reservoir 34 might be set at 2 hours. For further details of controlling a reservoir so as to avoid occupation of cigarettes beyond a predetermined maximum time, reference is directed to said British patent specification No. 2296000.

Although in a preferred mode of operation the majority of cigarettes pass from the making machine 10 to the packing machine 12 by way of the path including downdrop 22 and horizontal conveyor 24, it is possible to route all of the cigarettes through the reservoir 34. This could be achieved by stopping flow on the conveyor 24 and, preferably, in addition providing a gate or other closure device for the downdrop 22 at the junction 20. Such a gate or closure device may be substantially in the form disclosed in British patent specification No. 2157253 to which reference is directed for details.

What is claimed is:

1. A conveyor system for rod-like articles, particularly for conveying articles between a producing device and a receiving device, includes conveyor means for conveying a stream of articles in a multi-layer stack formation in a direction transverse to their lengths, and means for transferring batches comprising portions of the stream between the conveyor means and a transfer position by movement of the articles in a direction parallel to the lengths of the articles, wherein said transferring means is arranged so that at least in the region of said conveyor means the articles continue to move in said transverse direction as they are being transferred by said transferring means.

2. A conveyor system as claimed in claim 1, including means for moving said transferring means at the same speed as and in the same direction as said conveyor means.

3. A conveyor system as claimed in claim 1, including means for receiving a batch between said conveyor means and said transfer position, and wherein the transferring means includes a first pusher for transferring a batch from the transfer position to said receiving means and a second pusher for transferring said batch from the receiving means to said conveyor means.

4. A conveyor system as claimed in claim 1, wherein the batches are defined by spaced partitions carried by said conveyor means.

5. A conveyor system for rod-like articles, particularly for conveying articles between a producing device and a receiving device, includes conveyor means for conveying a stream of articles in a multi-layer stack formation in a direction transverse to their lengths, and means for transferring batches comprising portions of the stream between the conveyor means and a transfer position by movement of the articles in a direction parallel to the lengths of the articles, wherein said transferring means is arranged so that at least in the region of said conveyor means the articles being transferred move in said transverse direction, and including means for receiving a batch between said conveyor means and said transfer position, and means for cyclically moving said receiving means so that in a first part of said cycle it moves at a speed matched to that of the conveyor means for transfer of said batch from the conveyor means, and in a second part of said cycle it moves at a different speed.

6. A conveyor system as claimed in claim 5, wherein said receiving means is arranged to transfer a batch between said conveyor means and a stationary container at said transfer position, said receiving means being decelerated to a stationary position between said first and second parts of said cycle.

7. A conveyor system as claimed in claim 5, wherein the receiving means is linearly reciprocable along a path which is parallel to a path of the stream on said conveyor means.

8. A conveyor system as claimed in claim 5, wherein the transferring means is movable with said receiving means by said moving means.

9. A conveyor system as claimed in claim 8, wherein the transferring means comprises a pusher which is operable to transfer a batch from the conveyor means and into the receiving means, and is further operable to transfer the batch from the receiving means.

10. A conveyor system as claimed in claim 5, wherein the transferring means has a forward and return stroke, including means for moving the transferring means on said return stroke along a different path from the path it follows on the forward stroke.

11. A conveyor system for rod-like articles, particularly for conveying articles between a producing device and a receiving device, includes conveyor means for conveying a stream of articles in a multi-layer stack formation in a direction transverse to their lengths, and means for transferring batches comprising portions of the stream between the conveyor means and a transfer position by movement of the articles in a direction parallel to the lengths of the articles, wherein said transferring means is arranged so that at least in the region of said conveyor means the articles being transferred move in said transverse direction, wherein the batches are defined by spaced partitions carried by said conveyor means, and including further partition means movable with said stream, and means for moving said further partition means on a path having a first part in which said further partition means moves in synchronism with one of said spaced partitions of said conveyor means and a second part in which said further partition means moves at a different rate downstream of said conveyor means, said further partition means being capable of bounding the trailing end of the stream of articles downstream of said conveyor means.

12. A conveyor system as claimed in claim 11, wherein said further partition means includes first and second independently movable partitions, and means for progressively inserting said partitions into a stream of articles on said conveyor means.

13. A conveyor system for rod-like articles, particularly for conveying articles between a producing device and a receiving device, including conveyor means for conveying a stream of articles in multi-layer stack formation in a direction transverse to the lengths of the articles, means for loading articles into containers, means for unloading articles from containers and for delivering said articles to said conveyor means, wherein said delivering means includes means for transferring articles in a direction parallel to their lengths while conveying them also in a direction transverse to their lengths, so that said conveyor means may operate continuously.

14. A conveyor system for rod-like articles, particularly for conveying articles between a producing device and a receiving device, including conveyor means for conveying a stream of articles in multi-layer stack formation in a direction transverse to the lengths of the articles, means for loading articles into containers, means for unloading articles from containers and for delivering said articles to said conveyor means, wherein said delivering means includes means for transferring articles in a direction parallel to their lengths while conveying them also in a direction transverse to their lengths, so that said conveyor means may operate continuously, and including receiving means for receiving a batch of articles from a container, and means for linearly reciprocating said receiving means between a stationary position at which it receives the batch and a moving position at which it transfers the batch at the speed of the conveyor means.

15. A conveyor system as claimed in claim 14, wherein the transferring means includes pusher means for transferring the articles to said conveyor means, including means for moving said pusher means in the direction of said conveyor means.

16. A conveyor system as claimed in claim 15, wherein said receiving means and pusher means are moved together by said linearly reciprocating means.

17. A conveyor system as claimed in claim 15, wherein said transferring means includes further pusher means for transferring a batch of articles from a container to said receiving means.

18. A conveyor system for rod-like articles, particularly for conveying articles between a producing device and a receiving device, including means defining a conveying path for articles in multi-layer stack formation moving in a direction transverse to their lengths, transfer means for transferring successive batches of said stream from said path at a transfer position, first partition means including spaced first partitions for bounding the respective leading and trailing ends of successive batches delivered on said path to said transfer position, second partition means including at least one second partition for bounding the trailing end of a stream of articles on said path downstream of said transfer position, and means for moving said first and second partitions at different rates, whereby, following transfer of a batch at said transfer position to leave a gap in said path between a first partition at the leading end of a stream extending on said path upstream of said transfer position and a second partition at the trailing end of a stream extending on said path downstream of said transfer position, said respective first and second partitions may be brought together so that a continuous stream of articles may be reformed on said path by withdrawal of said partitions after they have been moved into mutually adjacent positions thereby closing said gap.

19. A conveyor system as claimed in claim 18, wherein said first partitions are carried by a first conveyor for moving said stream along said path, said partitions being insertable in the stream on said conveyor in a first direction.

20. A conveyor system as claimed in claim 19, including means for moving said at least one second partition along a portion of said path defined by said conveyor means, and for inserting said at least one second partition into said stream from a second direction which is substantially opposite said first direction.

21. A conveyor system as claimed in claim 20, wherein said conveyor means and said moving means are arranged so that first and second partitions are moved in synchronism in substantially adjacent positions over a portion of said path downstream of said transfer position.

22. A conveyor system as claimed in claim 20, wherein said moving means is arranged to bring said second partition to a stationary position in a portion of said path immediately downstream of said conveyor means.

23. A conveyor system as claimed in claim 18, including at least two second partitions movable independently so that one of said second partitions may be bounding the trailing end of a stream of articles on said path downstream of said transfer position and another of said second partitions may be movable with a first partition so as to bound the leading end of a stream of articles on said path downstream of the transfer position.

* * * * *